3,639,481
ARYL- AND ARALKYL-AMINOBENZOPHENONES
John Edwin Innes, Bridgewater Township, Somerset County, N.J., assignor to American Cyanamid Company, Stamford, Conn.
No Drawing. Filed May 16, 1968, Ser. No. 729,520
Int. Cl. C07c 87/48
U.S. Cl. 260—570            10 Claims

ABSTRACT OF THE DISCLOSURE

Compounds of the formula:

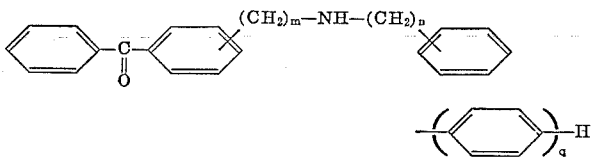

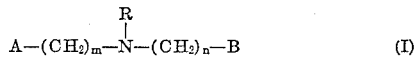

in which $m$ and $n$ are each separately 0 to 4, inclusive and the sum of $m$ and $n$ is at least 1, $q$ is from 1 to 4 inclusive, and the bonds to each of the benzophenone moiety and the polyphenylene moiety is in the 3 or 4 position are a new class of compounds which are useful in solid solution in a plastic matrix as photochromic materials, in which the color changes when subject to an activating radiation. Instead of benzophenones, xanthones and triphenylenes are also disclosed.

---

This invention relates to and has for its object the provision of a new class of photochromic organic compounds having the general formula:

$$A-(CH_2)_m-\underset{\underset{R}{|}}{N}-(CH_2)_n-B \qquad (I)$$

wherein R is hydrogen or alkyl, $m$ and $n$ are each 0 or 1–4. A is a moiety of an aromatic compound $A(CH_2)_m NHR$ having an efficient rate of intersystem crossing from the singlet manifold to the triplet manifold, and B is a moiety of an aromatic compound $B(CH_2)_n NHR$ having the first triplet state below (i.e., at lower energy than) the first triplet state of $A(CH_2)_m NHR$. Also, the first excited singlet of $B(CH_2)_n NHR$ is advantageously above the first singlet state of $A(CH_2)_m NHR$.

When $m$ and $n$ are both 0, $A(CH_2)_m NHR$ and $$B(CH_2)_n NHR$$

become ANHR and BNHR, respectively, and Formula I becomes A—N(R)—B. When $m$ is 1 and $n$ is 0, $$A(CH_2)_m NHR$$

and $B(CH_2)_n NHR$ become $ACH_2 NHR$ and BNHR, respectively, and Formula I becomes A—$CH_2$—N(R)—B. When $m$ is 0 and $n$ is 1, $A(CH_2)_m NHR$ and $$B(CH_2)NHR$$

become ANHR and $BCH_2 NHR$, respectively, and Formula I becomes A—N(R)—$CH_2$—B. When $m$ and $n$ are both 1, Formula I becomes $$A-CH_2-N(R)-CH_2-B$$

In the above, Compound $A(CH_2)_m NHR$, and moiety A derived therefrom, undergo a transition to the first excited singlet state upon exposure to light having a wavelength from 200–2,000 millimicrons. Compound $$A(CH_2)_m NHR$$

upon absorption of light in the stated range, must have a high inter-system crossing efficiency between the first excited singlet state and the lowest triplet state. Compound $B(CH_2)_n NHR$, from which moiety B is derived must have a lowest triplet state at a lower energy level than the lowest triplet state of Compound $A(CH_2)_m NHR$; furthermore, the energy difference between the first triplet level and the higher triplet level of compound $$B(CH_2)_n NHR$$

must be different from the energy difference between the ground state and the first excited singlet state of compound $A(CH_2)_m NHR$.

The advantages of photochromic compounds of this invention are: (1) rapid color development or change when irradiated by light and rapid color decay when the light is removed, and (2) increased intensity of the developed color due to great efficiency of energy transfer from one moiety to the other.

The compounds of this invention have many uses, such as in sunglasses, welding goggles, skylights, automobile windows and windshields, windows for buildings and dwellings, windows for space vehicles and aircraft, paints and surface coatings for novelty effects, energy measuring devices, etc.

The mechanism of the photochromic effect of the present invention requires that under light of a given wavelength, one fragment of the photochromic molecule $$"A-(CH_2)_m-N(R)-(CH_2)_n-B"$$

absorbs and is "activated," while the other fragment is not so-activated. The fragment which absorbs the incident light, known herein as the "donor" portion of the molecule, after absorption undergoes intersystem crossing from the excited singlet level to the triplet level and then transfers energy from its triplet level to the acceptor fragment.

The donor fragment, A, may be a complex system containing an acceptor moiety, B′ (which may or may not be the same as B), but still retaining the capability of donating energy to the acceptor moiety B. The acceptor fragment in its lowest triplet level absorbs light in the range of 200–2,000 millimicrons and is converted to a higher triplet state.

The acceptor fragment, B, may be a complex system containing a donor moiety, A′ (which may or may not be the same as A), but still retaining the capability of accepting energy from the donor moiety A.

The absorption of light by the acceptor fragment in its triplet state is observed as color, which disappears when the light source is removed. This is the photochromic effect. In essence, therefore, the present invention provides a means for converting the acceptor fragment to a form, namely its lowest triplet state, which is capable of absorbing light in the range of 200–2,000 millimicrons. The donor portion thus acts as an activator for the acceptor portion, so that the latter is converted to its light-absorbing triplet state.

In summary, a triplet-triplet photochromic system is obtained by incorporating in a non-opaque substrate, a compound having specific acceptor and specific donor moieties, neither one of the compounds corresponding to the said moieties having been expected to exhibit useful or substantial photochromism when used individually. One moiety (the acceptor) has a long-lived triplet state and an excited singlet state which does not convert readily into this triplet state. The other moiety (the donor) is easily converted from an excited singlet to a triplet of greater energy than the acceptor triplet. The energy of the donor triplet is efficiently transferred to the acceptor moiety, thereby forming the long-lived acceptor triplet. The absorption spectrum of the acceptor triplet is the source of photochromism. The excited singlet state of the donor is obtainable either by direct absorption of light or by transferal of energy from a more energetic excited singlet state of the donor or acceptor.

The present invention includes the use of compounds in which the acceptor moiety is deuterated. Deuterated derivatives exhibit first triplet states with longer lifetimes which will give a higher concentration of molecules in this triplet state and may thus be preferred if the undeuterated compound does not give sufficient absorption intensity during exposure to light.

As will be noted, the compounds "A(CH$_2$)$_m$NHR" and "B(CH$_2$)$_n$NHR" and, consequently, the fragments "A" and "B" may be substituted by substituents such as alkyl radicals of one to eighteen carbons, alkoxy radicals of one to eighteen carbons, halo radicals (e.g., chlorine and fluorine), amino radicals such as dialkylamino groups, alkanamido groups, and the like. It may be desirable in many cases to have various substituents on the "A" or "B" fragment to aid in dissolving the photochromic compound in the substrate in which it is to be used, since some of the unsubstituted compounds are relatively insoluble in most conventional solvents. Long chain alkyl or alkoxy groups in many cases overcome this difficulty.

The compounds of this invention may be incorporated in non-opaque substrates capable of transmitting light in the range of 200 to 2,000 millimicrons. The nature of the substrate may vary considerably over a broad class of compositions ranging from fluids to solids. The solids may be either crystalline or amorphous, among the most suitable being glasses and polymeric materials.

The glasses include low temperature glasses derived from organic solvents, such as 2-methyltetrahydrofuran, methylcyclohexane, and ether-pentane-alcohol; inorganic glasses such as phosphate glasses and borate glasses are also suitable. When liquid subtrates are used, the lifetime of the "B" triplet level is usually short, so that the photochromic effect can be detected only instrumentally.

The polymeric materials which may be used in this invention include a wide range of polymeric materials which exist today. For many purposes, the polymeric material should have optical transparency. A lack of color is also desirable. The polymeric materials include thermoplastics such as polyacrylates, polymethacrylates, cellulose acetate, cellulose propionate, cellulose acetate-butyrate, cellulose nitrate, ethyl cellulose, polycarbonates, polyacrylonitrile, polyamides, polystyrene, poly(methylstyrenes), poly(chloromethyl - styrenes), poly(styrene - butadiene), poly(vinyl acetate), poly(vinyl acetals), poly(vinyl chloride), poly(vinyl butyral), poly(vinyl formal), chlorinated polyethers and silicones; and thermosetting resins such as phenol-formaldehyde condensates, melamine-formaldehyde condensates, polyester-styrene combinations, polyurethanes, epoxies, and copolymers and mixtures thereof.

Triplet molecules are also known as biradicals because they possess two unpaired electrons. As such, they are extremely reactive and interact with each other, with oxygen or with any paramagnetic species. Thus, it is advantageous to employ a polymeric matrix of good optical clarity that is free from residual monomer, plasticizers, and atoms, molecules, ions or molecular fragments capable of reacting rapidly with the metastable triplet state entities which govern the photochromic effects herein disclosed.

The photochromic material is uniformly dispersed throughout the plastic matrix. This can be done by adding the compound to the monomer or monomers followed by polymerization; by dissolving the polymer and photochromic compound in a solvent and casting a rigid sheet, film or other form; by milling the photochromic combination of compounds with the polymeric material, etc. The photochromic compound can also be applied to the formed plastic article.

The photochromic effect is a function of the concentration of the photochromic compound, the thickness of the substrate and the intensity of the exciting radiation. Given adequate light intensity the effect increases with increasing concentration and also increases with increasing thickness. For a given concentration and thickness, the effect increases with increasing light intensity up to the saturation value.

The amount of the photochromic compound to be used in the compositions of the invention may range from 0.0001 to 2.0% based on the amount of non-opaque substrate. In normal practice, at least 0.0001%, preferably at least 0.05% of the photochromic compound is employed.

A preferred class of compounds of this invention has the following Formula II:

wherein $m$ and $n$ are as above, $q$ is an integer equal to or greater than 1 (e.g. between 1 and 4), and D is a moiety of the group consisting of:

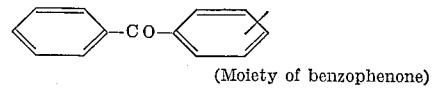

(Moiety of benzophenone)

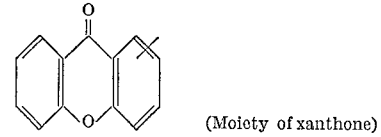

(Moiety of xanthone)

and

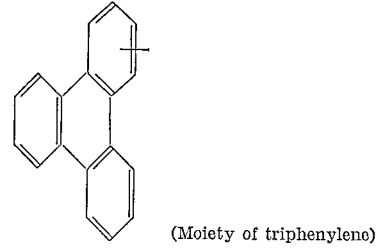

(Moiety of triphenylene)

The compounds of Formula I can be prepared by conventional methods.

When $m$ and $n$ are both zero (compounds of Formula Ia), the compounds can be prepared by reacting an amino compound (Formulae III and VI) with a halo compound (Formulae IV and V), according to reactions (1) and (2).

(1)   A—NHR + hal—B ⟶ A—NR—B + H—hal
       III      IV              Ia (2)   A—hal + RNH—B ⟶ A—NR—B + H—hal
       V       VI              Ia When $m$ or $n$ is 1–4 and the other is 0, the compounds of Formulae Ib and Ic can be prepared by reacting a halo-alkyl compound (Formulae VII and VIII) with an amino compound (Formulae III and VI) according to reactions (3) and (4).

(3) A-(CH$_2$)$_m$-hal + RNH-B ⟶ A-(CH$_2$)$_m$-NR-B + H-hal
        VII              VI              Ib (4) A-NHR + hal-(CH$_2$)$_n$-B ⟶ A-NR-(CH$_2$)$_n$-B + H-hal
      III        VIII                Ic When both $m$ and $n$ are 1–4, the compounds of Formula Id can be prepared by reacting a halo-alkyl compound (Formulae VII and VIII) with an amino-alkyl compound (Formulae IX and X) according to reactions (5) and (6).

(5) A—(CH₂)ₘ—hal + RNH—(CH₂)ₙ—B ⟶
    VII             IX

A—(CH₂)ₘ—NR—(CH₂)ₙ—B + H—hal
    Id (6) A—(CH₂)ₘ—NHR + hal—(CH₂)ₙ—B ⟶
    X             VIII A—(CH₂)ₘ—NR—(CH₂)ₙ—B + H—hal
    Id It is advantageous to carry out reactions (1), (2), (3), (4), (5) and (6) in an inert solvent and in the presence of an acid binder, such as potassium carbonate.

When reaction (1) is used to prepare compounds of Formula I, suitable amino compounds (Formula III) include 3-aminobenzophenone, 4-aminobenzophenone, 3-amino-4'-methoxybenzophenone, 4-amino - 2 - methylbenzophenone, 4-amino - 2' - chlorobenzophenone, 4-amino-4' - methoxybenzophenone, 3 - aminoxanthone, etc.; and suitable halo compounds (Formula IV) include 3-bromobiphenyl, 4-bromo-4'-methylbiphenyl, 4-bromo-p-terphenyl, 4-chloro-p-terphenyl, 4-iodo-p-terphenyl, 4-iodo-3,3'-dimethyl - p - terphenyl, 4-iodo-p-quaterphenyl, 4 - iodo-2″,3,3',3'-teramethyl-p-quaterphenyl, etc.

When reaction (2) is used to prepare compound of Formula I, suitable halo compounds (Formula V) include 3-bromobenzophenone, 4-bromobenzophenone, 4-bromo-4'-fluorobenzophenone, 4 - chloro-2',3'-dimethoxybenzophenone, 4-chloro-4-methylbenzophenone, 2-chloroxanthone, 3-chloroxanthone, etc.; and suitable amino compounds (Formula VI) include 3-biphenylamine, 4-biphenylamine, 4'-chloro-4-biphenylamine, 4'-fluoro-4-biphenylamine, 2'-fluoro-4-biphenylamine, 2',6-dimethyl-3-biphenylamine, 4'-butoxy-4-biphenylamine, N-methyl-4-biphenylamine, p-terphenyl-3-amine, p-terphenyl-4-amine, 4″-methoxy-p-terphenyl-4-amine, p-quaterphenyl - 4 - amine, etc.

When reaction (3) is used to prepare compounds of Formula I, suitable halo-alkyl compounds (Formula VII) include 4-(bromomethyl)benzophenone, 3-(bromomethyl)benzophenone, 4-(3 - bromopropyl)benzophenone, 2-bromomethyl)triphenylene, 2 - (chloromethyl)triphenylene, etc.; and suitable amino compounds (Formula VI) include 3-biphenylamine, 4-biphenylamine, 4'-chloro-4-biphenylamine, 4'-fluoro - 4 - biphenylamine, 2'-fluoro-4-biphenylamine, 2',6-dimethyl-3-biphenylamine, 4'-butoxy-4-biphenylamine, N-methyl-4-biphenylamine, p-terphenyl-3-amine, p-terphenyl - 4 - amine, 4″-methoxy-p-terphenyl-4-amine, p-quaterphenyl-4-amine, etc. A similar method can be used to provide compounds containing two donor moieties and one acceptor moiety. A halomethyl compound of Formula VII is reacted with a diamino compound, such as benzidine, tolidine, p-terphenyl-4,4″-diamine, etc.

When reaction (4) is used to prepare compounds of Formula I, suitable amine compounds (Formula III) include 3-aminobenzophenone, 4-aminobenzophenone, 3-amino-4'-methoxybenzophenone, 4-amino-2-methylbenzophenone, 4-amino-2'-chlorobenzophenone, 4-amino-4'-methoxybenzophenone, 3-aminoxanthone, etc.; and suitable halo-alkyl compounds (Formula VIII) include 4-(bromomethyl)biphenyl, 4-(2-bromoethyl)biphenyl, etc.

When reaction (5) is used to prepare compounds of Formula I, suitable halo-alkyl compounds of Formula VII include 4-(bromomethyl)benzophenone, 3-bromomethyl)benzophenone, 4-(3-bromopropyl)benzophenone, 2-(bromomethyl)triphenylene, 2 - (chloromethyl)triphenylene, etc.; and suitable amino-alkyl compounds of Formula IX include p - phenylbenzylamine, p-phenylphenethylamine, etc.

When reaction (6) is used to prepare compounds of Formula I, suitable amino-alkyl compounds of Formula X include 4-(2-aminoethyl)benzophenone, 4-(aminomethyl)xanthone, etc.; and suitable halo-alkyl compounds of Formula VIII include 4-(bromomethyl)biphenyl, 4-(2-bromoethyl)biphenyl, etc.

Representative products of Formula I which may be made by reactions (1) and (2) include 4-(3-biphenylylamino)benzophenone, 3 - (4-biphenylylamino)benzophenone, 4-(p-terphenyl-4-ylamino)benzophenone, 4-(p-quaterphenyl - 4 - ylamino)benzophenone, 3-(p-terphenyl-3-ylamino)xanthone, etc.

Representative products of Formula I which may be made by reaction (3) include 4-(p-terphenyl-4-ylaminomethyl)benzophenone, 4-(4-biphenylylaminomethyl)benzophenone, 4 - (3-biphenylylaminomethyl)benzophenone, 4-(p-quaterphenyl-4-ylaminomethyl)benzophenone, 4-[N-methyl-N-(4 - biphenylyl)aminomethyl]benzophenone, 2-(p-terphenyl-4-ylaminomethyl)triphenylene, 4-(4'-butoxy-4-biphenylylaminomethyl)benzophenone, etc.

Representative products of Formula I which may be made by reaction (4) include 3-(4-biphenylylmethylamino)benzophenone, 4-(4-biphenylmethylamino)benzophenone, 3 - (4-biphenylylmethylmethylamino)xanthone, 4-(4-biphenylylmethylamino)-2-methylbenzophenone, etc.

Representative products of Formula I which may be made by reactions (5) and (6) include 4-(4-biphenylylmethylaminomethyl)benzophenone, 4-[3-(4 - biphenylylmethylamino)propyl]benzophenone, 2-[2-(4-biphenylyl)ethylaminomethyl]triphenylene, 4 - (4 - biphenylylmethylaminomethyl)xanthone, etc.

The following examples are presented to further illustrate the present invention.

EXAMPLE 1

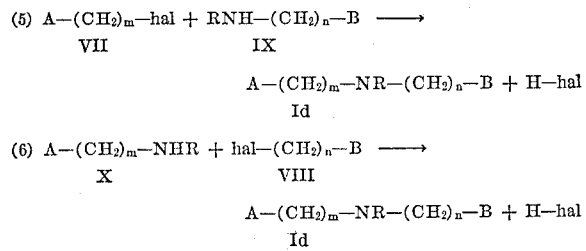

A mixture of 1.40 g. (0.005 mole) 4-(bromomethyl)benzophenone 1.23 g. (0.005 mole) p-terphenyl-4-amine, 0.75 g. (0.0054 mole) potassium carbonate and 50 ml. 80% aqueous acetone is refluxed for 28 hours. The precipitate is separated by filtration, washed with methanol and dried. The product, 4-(p-terphenyl-4-ylaminomethyl) benzophenone, is obtained, after recrystallization from benzene, as yellow crystals melting at 235–237° C.

When the procedure is repeated, substituting an equivalent amount of p-terphenyl-3-amine for the p-terphenyl-4-amine, the product is 4-(p-terphenyl-3-ylaminomethyl) benzophenone.

When the procedure is repeated substituting an equivalent amount of 4″-methoxy-p-terphenyl-4-amine for the p-terphenyl-4-amine, the product is 4-(4″-methoxy-p-terphenyl-4-ylaminomethyl)benzophenone.

When the procedure is repeated substituteing an equivalent amount of 4-(3-bromopropyl)benzophenone for the 4-(bromomethylbenzophenone, the product is 4[3-(p-terphenyl-4-ylamino)propyl]benzophenone.

When the procedure is repeated substituting an equivalent amount of p-phenylbenzylamine for the p-terphenyl-4-amine, the product is 4-(4-biphenylylmethylaminoethyl) benzophenone.

EXAMPLE 2

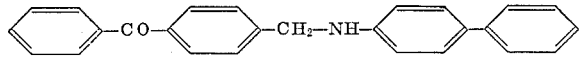

A mixture of 1.40 g. (0.005 mole) 4-(bromomethyl) benzophenone, 0.85 g. (0.005 mole) 4-biphenylamine, 0.75 g. (0.054 mole) potassium carbonate, and 50 ml.

80% aqueous acetone is refluxed for six hours. The precipitate is purified by chromatography on acid-washed, activated alumina using benzene as the solvent. The desired product, 4 - (4 - biphenylylaminomethyl)benzophenone, is obtained, after recrystallization from benzene, as yellow crystals melting at 188–189° C.

When the procedure is repeated substituting an equivalent amount of 3-biphenylamine for the 4-biphenylamine, the product is 4-(3-biphenylylaminomethyl)benzophenone.

When the procedure is repeated substituting an equivalent amount of 4′-fluoro-4-biphenylamine or 4′-chloro-4-biphenylamine for the 4-biphenylamine, the products are 4-(4′-fluoro-4-biphenylylaminomethyl)benzophenone and 4 - (4′ - chloro-4-biphenylylaminomethyl)benzophenone, respectively.

When the procedure is repeated substituting an equivalent amount of n-methyl-4-biphenylamine for the 4-biphenylamine, the product is 4-[N-methyl-N-(4-biphenylyl)aminomethyl]benzophenone.

EXAMPLE 3

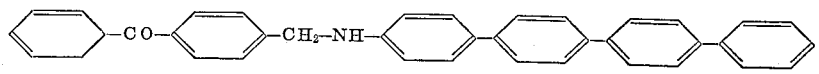

The procedure of Example 1 is repeated substituting 1.61 (0.005 mole) p-quaterphenyl-4-amine for the p-terphenyl-4-amine. The product is 4-(p-quaterphenyl-4-ylaminomethyl)benzophenone.

EXAMPLE 4

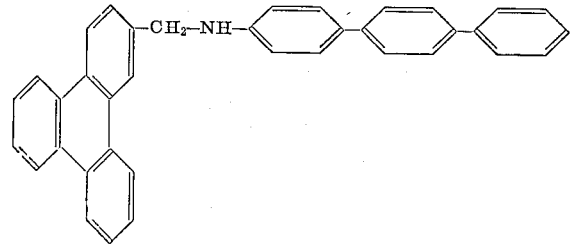

The procedure of Example 1 is repeated substituting 1.39 g. (0.005 mole) 2-(chloromethyl)triphenylene for the 4-(bromomethyl)benzophenone. The product is 2-(p-terphenyl-4-ylaminomethyl)triphenylene.

EXAMPLE 5

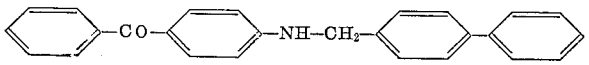

The procedure of Example 2 is repeated substituting 1.24 g. (0.005 mole) 4-(bromomethyl)biphenyl and 0.99 g. (0.005 mole) 4-aminobenzophenone for the 4-(bromomethyl)benzophenone and 4-biphenylamine, respectively. The product is 4 - (4-biphenylylmethylamino,benzophenone.

When the above procedure is repeated substituting an equivalent amount of 3-aminobenzophenone for the 4-aminobenzophenone, the product is 3-(4-biphenylylmethylamino)benzophenone.

When the above procedure is repeated substituting an equivalent amount of 4-amino-2-methylbenzophenone for the 4-aminobenzophenone, the product is 4-(4-biphenylylethylamino)]benzophenone.

When the procedure is repeated substituting an equivalent amount of 4-(2-bromoethyl)biphenyl for the 4-(bromomethyl)biphenyl, the product is 4-[2-(4-biphenylylethylamino]benzophenone.

EXAMPLE 6

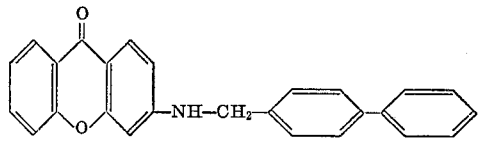

The procedure of Example 5 is repeated substituting 1.06 g. (0.005 mole) 3-aminoxanthone for the 4-aminobenzophenone. The product is 3-(4-biphenylylmethylamino)xanthone.

EXAMPLE 7

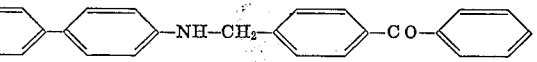

A mixture of 0.61 g. (0.0033 mole) benzidine, 2.0 g. (0.0073 mole) 4-(bromomethyl)benzophenone, 1.01 g. (0.0073) potassium carbonate and 25 ml. 80% aqueous acetone is refluxed for 23 hours. The mixture is cooled, and the precipitate is separated by filtration, washed with water and methanol and recrystallized from n-butanol. The product is fractionally chromatographed on alumina using benzene as the solvent. The desired product, N,N′-bis(4-benzoylbenzyl) benzidine, is obtained as yellow crystals melting at about 195° C.

EXAMPLE 8

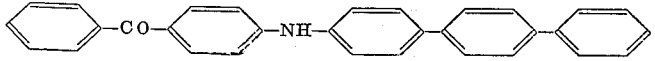

The procedure of Example 1 is repreated substituting 1.30 g. (0.005 mole) 4-bromobenzophenone for the 4-(bromomethyl)benzophenone. The product is 4-(p-terphenyl-4-ylamino)benzophenone.

EXAMPLE 9

A mixture of 0.050 g. 4-(p-terphenyl-4-ylaminomethyl)benzophenone (product of Example 1) and 2.16 g. of a commercial epoxy resin (Shell Epon 828) is dissolved in about 45 g. benzene. The benzene is evaporated, the last traces being removed in vacuo, and the residual mixture is blended with 2.0 g. phthalic anhydride, with slight heating to effect solution. The resulting resin mixture is cast between two lantern slide cover glasses using 0.5 mm. cellulose acetate spacers and is cured in an oven at 120° C. for two days.

When the polymer sheet is exposed to a mercury SH arc lamp, the color changes from pale yellow to deep blue-violet with a lifetime of about one second. In sunlight, its color becomes light blue.

The general theory of triplet photochromic filters, polymeric substrates therefor, and methods of preparation and use are described in detail in Canadian Pat. 746,257 of Nov. 15, 1966.

When the procedure is repeated substituting the product of Example 2 for the product of Example 1, the polymer, when exposed to an SH arc lamp, changes from colorless to yellow.

When the procedure is repeated substituting the product of Example 7 for the product of Example 1, the yellow color of the polymer, when exposed to an SH arc lamp, becomes redder.

I claim:
1. A compound having the formula:

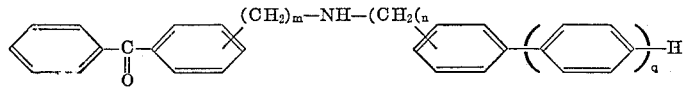

wherein $m$ is 0 to 4 and $n$ is 0 to 4 and the sum of $m$ and $n$ is at least 1, $q$ is an integer between 1 and 4 inclusive, with the bond to the benzophenone moiety and to the polyphenylene moiety each being in the 3 or 4 position.

2. The compound according to claim 1 which is 4-(p-terphenyl-3-ylaminomethyl)benzophenone.

3. The compound according to claim 1 which is 4-[3-(p-terphenyl-4-ylamino)propyl]benzophenone.

4. The compound according to claim 1 which is 4-(4-biphenylylmethylaminomethyl)benzophenone.

5. The compound according to claim 1 which is 4-(3-biphenylylaminomethyl)benzophenone.

6. The compound according to claim 1 which is 3-(4-biphenylmethylamino)benzophenone.

7. The compound according to claim 1, which is 4-(p-polyphenyl-4-ylaminomethyl)benzophenone, in which the polyphenyl group is a straight chain of 2 to 5 phenyl rings.

8. The compound, according to claim 7 which is 4-(p-terphenyl-4-ylaminomethyl)benzophenone.

9. The compound, according to claim 7 which is 4-(4-biphenylylaminomethyl)benzophenone.

10. The compound according to claim 7 which is 4-(p-quaterphenyl-4-ylaminomethyl)benzophenone.

References Cited

UNITED STATES PATENTS 3,449,425    6/1969    Reich et al. _____ 260—570

ROBERT V. HINES, Primary Examiner

U.S. Cl. X.R.

117—159, 201; 252—300; 260—47, 335, 570.9, 571, 576, 577, 578, 570(R); 296—78, 84; 351—41

UNITED STATES PATENT OFFICE
CERTIFICATE OF CORRECTION

Patent No. 3,639,481              Dated February 1, 1972

Inventor(s)        JOHN EDWIN INNES

It is certified that error appears in the above-identified patent and that said Letters Patent are hereby corrected as shown below:

Column 5, line 26 "2",3,3',3'-teramethyl" should read -- 2",3,3',3'-tetramethyl --.

Column 5, line 73 "3-bromomethyl)" should read -- 3-(bromomethyl) --.

Column 6, line 27 "3-(4-biphenylylmethylmethylamino)" should read -- 3-(4-biphenylylmethylamino) --.

Column 6, line 61 "substituteing" should read -- substituting --.

Column 6, line 67 "4-(4-biphenylylmethylaminoethyl)" should read -- 4-(4-biphenylylmethylaminomethyl) --.

Column 6, line 75 "(0.054 mole)" should read -- (0.0054 mole) --.

Column 8, line 4 "ylethylamino)]" should read -- ylmethylamino)] --.

Signed and sealed this 25th day of July 1972.

(SEAL)
Attest:

EDWARD M. FLETCHER, JR.                ROBERT GOTTSCHALK
Attesting Officer                      Commissioner of Patents